(12) United States Patent
Takeuchi

(10) Patent No.: US 7,755,409 B2
(45) Date of Patent: Jul. 13, 2010

(54) CLOCK SIGNAL GENERATOR

(75) Inventor: Kesatoshi Takeuchi, Shiojiri (JP)

(73) Assignee: Seiko Epson Corporation (JP)

( * ) Notice: Subject to any disclaimer, the term of this patent is extended or adjusted under 35 U.S.C. 154(b) by 210 days.

(21) Appl. No.: 12/001,875

(22) Filed: Dec. 13, 2007

(65) Prior Publication Data

US 2008/0143414 A1    Jun. 19, 2008

(30) Foreign Application Priority Data

Dec. 14, 2006 (JP) .............................. 2006-336494
Nov. 2, 2007 (JP) .............................. 2007-286319

(51) Int. Cl.
*G06F 1/04* (2006.01)
(52) U.S. Cl. ..................... 327/291; 327/294; 327/164
(58) Field of Classification Search ................ 327/291, 327/293, 294, 297, 299, 164
See application file for complete search history.

(56) References Cited

U.S. PATENT DOCUMENTS 4,779,183 A * 10/1988 Mutoh et al. ................. 363/41
5,052,021 A * 9/1991 Goto et al. .................. 375/317
5,418,409 A * 5/1995 Kuhn ........................... 327/78
7,479,808 B2 * 1/2009 Groiss ........................ 327/74

FOREIGN PATENT DOCUMENTS

JP    08-044465    2/1996

* cited by examiner

*Primary Examiner*—Lincoln Donovan
*Assistant Examiner*—Hai L Nguyen
(74) *Attorney, Agent, or Firm*—Harness, Dickey & Pierce, P.L.C.

(57) ABSTRACT

A clock signal generator including: a signal generation unit that outputs a first clock signal composed of a single frequency component; and a phase angle detection unit that detects phase angles of the first clock signal by comparing a plurality of threshold values set within the amplitude of the first clock signal with instantaneous values of the first clock signal by using window comparators, and generates a second clock signal by determining rising and/or falling edges of the signal according to the detected phase angles.

6 Claims, 15 Drawing Sheets

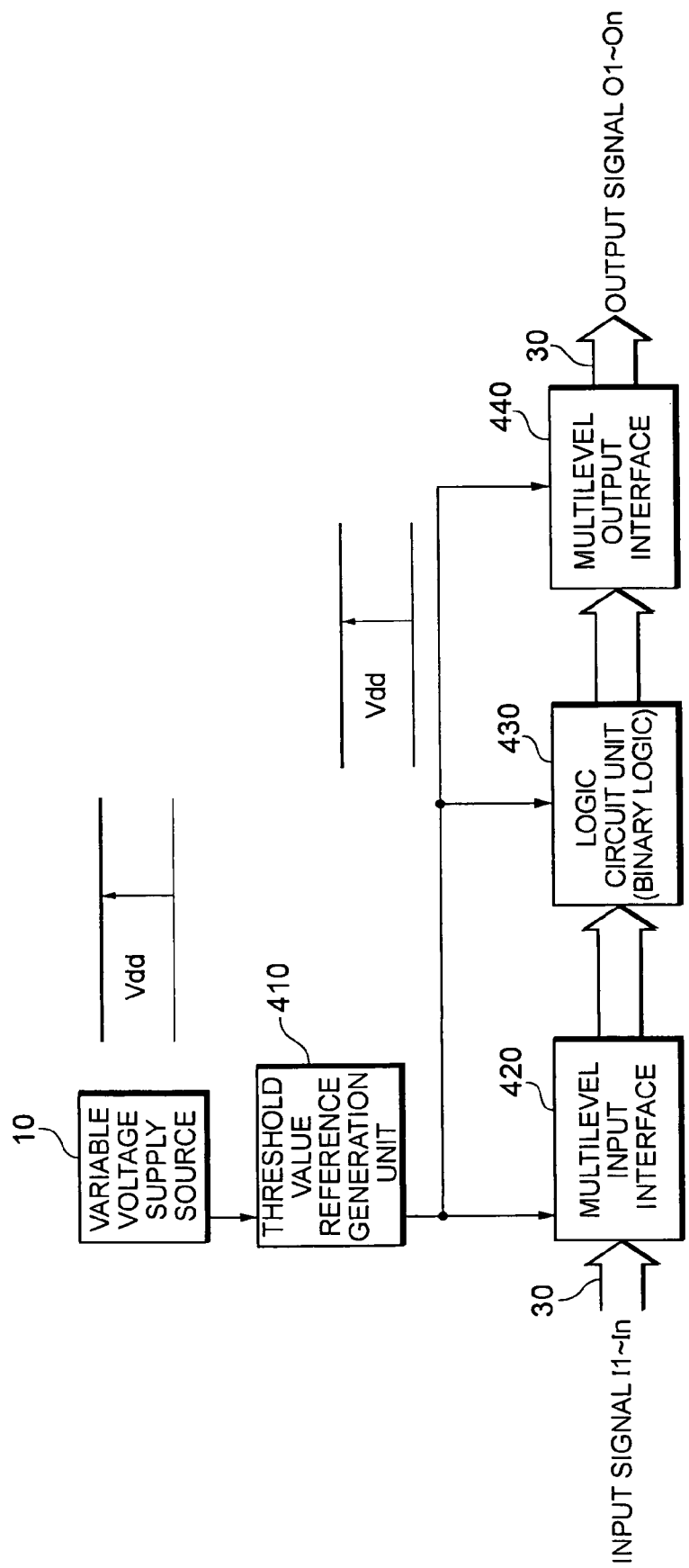

SYSTEM CLOCK SIGNAL S2

RECTANGULAR WAVE

TRANSMISSION CLOCK SIGNAL1

TRANSMISSION CLOCK SIGNAL2

CLOCK SIGNAL GENERATOR

The entire disclosure of Japanese Patent Applications No. 2006-336494, filed on Dec. 14, 2006 and No. 2007-286319, filed on Nov. 2, 2007, is expressly incorporated by reference herein.

BACKGROUND

1. Technical Field

The present invention relates to a clock signal generator generating a clock signal for an information processor, particularly to a clock signal generator suitable for multilevel signal transmission.

2. Related Art

In information processors such as computer systems, binary clock signals (rectangular waves) are used to synchronize the operations of digital ICs. The frequencies of the clock signals in the systems increase (e.g., to several hundred MHz) to enable high-speed operation of the CPUs and, in the CPU chips, the system clock signals are multiplied N (natural number)-fold by PLL (phase locked loop) circuits when they are used.

Meanwhile, in order to achieve power saving in the information processors, supply voltages are continuously changed from 5 volts to 3.3 volts according to the size of the loads on the CPUs, and the frequencies of the operational clock signals in the systems are continuously changed from high to low. For example, JP-A-8-044465 suggests a method for continuously changing an operational clock frequency in a micro processor in accordance with the load on the micro processor and supplying a power supply voltage corresponding to the operational clock frequency to the micro processor, thereby achieving balance between an appropriate operation speed (clock signal frequency) and power consumption reduction.

SUMMARY

However, because clock signals used in information processors are rectangular waves, waveform distortion occurs due to N-order harmonic components during signal transmission and so information transmission efficiency degrades. Moreover, when sending a clock signal to a plurality of devices, there is variation in signal delays due to the different high-frequency propagation characteristics of the signal transmission systems, which makes phase matching difficult. Furthermore, IC-mounting boards and signal buses are likely to generate radiation noise due to odd-order harmonics.

Even when relatively low system clock frequencies are set in order to achieve power saving in information processors as described above, a decrease in the data transmission rate is undesirable. The applicant has studied multilevel signal transmission as a data transmission method for an information processor capable of preventing such a decrease. It is desirable that there is a clock signal suitable as a transmission clock signal for the multilevel signal transmission.

An advantage of some aspects of the invention is to provide a clock signal generator that generates a clock signal less likely to cause waveform distortion or phase distortion due to signal delays during clock signal transmission. Another advantage of some aspects of the invention is to provide a clock signal generator that generates a clock signal suitable for multilevel signal transmission.

In order to achieve the advantages, the clock signal generator according to the invention includes: a signal generation unit that outputs a first clock signal composed of a single frequency component; and a phase angle detection unit that detects the phase angles of the first clock signal by comparing a plurality of threshold values set within the amplitude of the first clock signal with the instantaneous values of the first clock signal, and generates a second clock signal by determining rising and/or falling edges of the signal according to the detected phase angles.

With the above structure, a clock signal can be generated based on a single frequency component, a clock signal having less odd-order harmonic components can be obtained, and waveform distortion of a transmission signal and variation in transmission delays of signal components can be reduced. Also, noise due to radiation of odd-number harmonic components can be reduced.

In a preferable embodiment of the invention, the rising and/or falling edges are determined by using a first group of threshold values in the first half of the cycle of the first clock signal and using a second group of threshold values in the latter half of the cycle of the first clock signal. Accordingly, the harmonic frequency distribution (frequency spectrum) of the second clock signal can be controlled.

In a preferable embodiment of the invention, the comparison between the threshold values and the instantaneous values is performed by window comparators. Accordingly, whether or not the phases of the first clock signal are of specified phase angles can be determined.

In a preferable embodiment, the second clock signal is used as a transmission clock signal for a signal bus, and the maximum amplitude value of the waveform of the first clock signal is determined according to the maximum value of a multilevel signal passing through a data line in the signal bus. Accordingly, even when the maximum value (signal amplitude) of a multilevel signal in the signal value changes according to a change in a circuit supply voltage, a corresponding transmission clock signal can be obtained, which is very convenient.

In a preferable embodiment, it is possible to generate a third clock signal from a signal phase shifted (e.g., $\pi/2$ (90 degrees)) from the first clock signal composed of the signal frequency component, and combine the third clock signal with the second clock signal based on a predetermined logic to generate a fourth clock signal. The fourth clock signal is used, for example, as a transmission clock for the signal bus. Accordingly, an appropriate number of waves (number of pulses) and appropriate waveform width (frequency spectrum distribution) can be obtained.

In a preferable embodiment, the first clock signal is a sine wave (sine curve, cosine curve) having a non-discrete (non-digital) waveform. Alternatively, the first clock signal may be a triangle wave similar to a sine wave.

An information processor according to the invention includes the above-described clock signal generator.

BRIEF DESCRIPTION OF THE DRAWINGS

FIG. 3 illustrates an example of a function module in the information processor.

DESCRIPTION OF EXEMPLARY EMBODIMENTS

Embodiments of the invention will be explained below with reference to the drawings.

Figure 2:
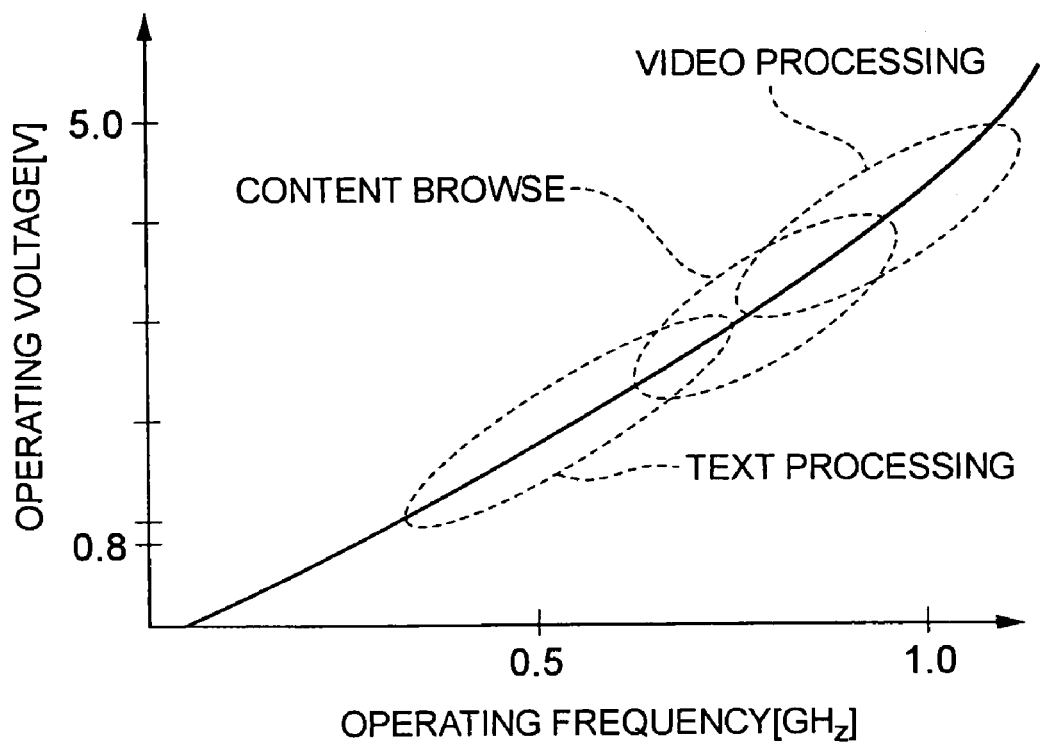
FIG. 2 is a graph explaining an information processor capable of continuously changing a source voltage.

First, power saving in an information processor (i.e., computer system) by changing a power supply voltage, which is the background of the invention, will be explained below with reference to FIG. 2. FIG. 2 shows the case where the operating voltage of a CPU chip or a module including a CPU is continuously variable.

In FIG. 2, the horizontal axis represents an operating clock frequency [GHz] of a CPU (or data bus) and the vertical axis represents a power supply voltage [V] supplied to the CPU or a CPU module. For example, when an application program executed on the information processor (computer system) is for processing video such as television broadcasts or DVDs, or multichannel audio, there is a huge amount of data to be processed, so the operating clock frequency is increased approximately to a maximum frequency so that a high CPU throughput is achieved. The operating voltage is also set high so that the under-load driving capacity of a transistor is increased to enable high-speed operation. Meanwhile, when the application program executed is for processing texts, the amount of data to be processed by the CPU is small, so the operating clock frequency is decreased to a low frequency so that the power consumption in the CPU is reduced. The operating voltage is also set low so that the current flowing into the transistor is reduced, to reduce the power consumption. Meanwhile, when the application program executed is for viewing sites on the Internet or reading content (multimedia), the operating clock frequency is set to an intermediate level between the level for the text processing and the level for the video processing so that the power consumption in the CPU and the throughput of the CPU is balanced. The operating voltage is also set to an intermediate value. Meanwhile, when input units (keyboard, mouse, communication unit etc. (not shown in the drawing) are in a waiting state, the CPU enters a standby mode because of the minimum voltage/minimum frequency, and when an event occurs in any of the input units, it starts to operate in one of the above-described states, according to the type of the event.

Figure 15:
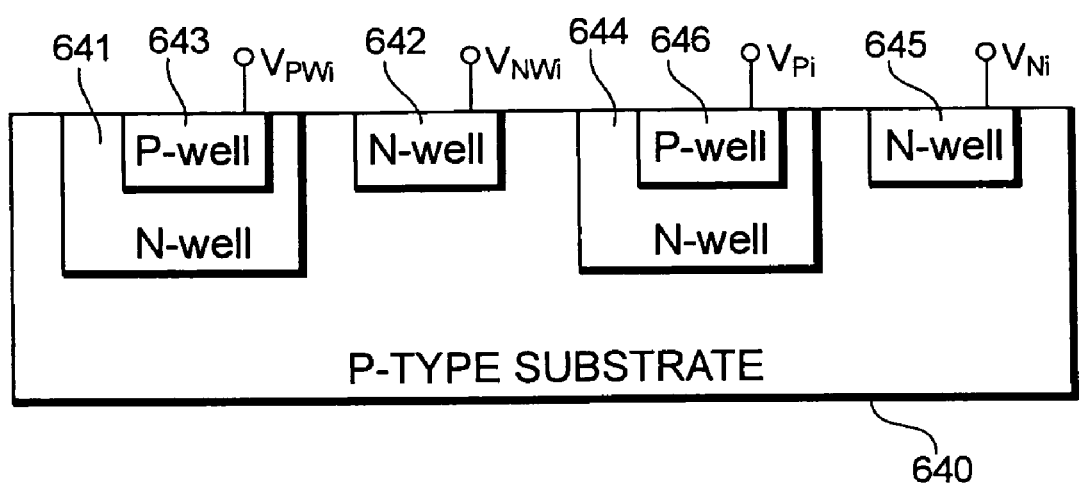
FIG. 15 illustrates back gate voltage control.

Note that, regarding power saving in an information processor, the applicant also suggests, in another application (JP-A-2004-336010), a technique for controlling the back gate potentials in MOS transistors in each circuit block, as shown in FIG. 15, thereby controlling the operation of the transistors for each circuit block. With that technique, threshold values for the MOS transistors can be controlled so that, even when the power supply voltage continuously changes (within a certain voltage range), the MOS transistor can still operate and so a VLSI chip can function even at a low voltage.

FIG. 15 shows the well structure of a VLSI chip. On a P-type substrate 640, N-wells 641, 642, 644 and 645 are formed isolated from one another. Moreover, a P-well 643 is formed in the N-well 641 and a P-well 646 is formed in the N-well 644, i.e., the P-type substrate 640 has a triple well structure. The P-well 643 forms an NMOS transistor MNi and its well potential $V_{PWi}$ represents the back gate potential of the transistor MNi. The N-well 642 forms a PMOS transistor MPi and its well potential $V_{NWi}$ represents the back gate potential of the transistor MPi. The N-well 645 forms a PMOS transistor constituting a logic element of the circuit block and the P-well 646 forms an NMOS transistor constituting another logic element of the same. The well potential $V_{Pi}$ represents the back gate potential of the NMOS transistor and the well potential $V_{Ni}$ represents the back gate potential of the PMOS transistor.

As described above, both power savings and provision of enough throughput can be achieved in a computer system by continuously changing the operating clock frequency and operating voltage of a CPU in accordance with the application program(s) executed or the start/end of an event.

Figure 1:
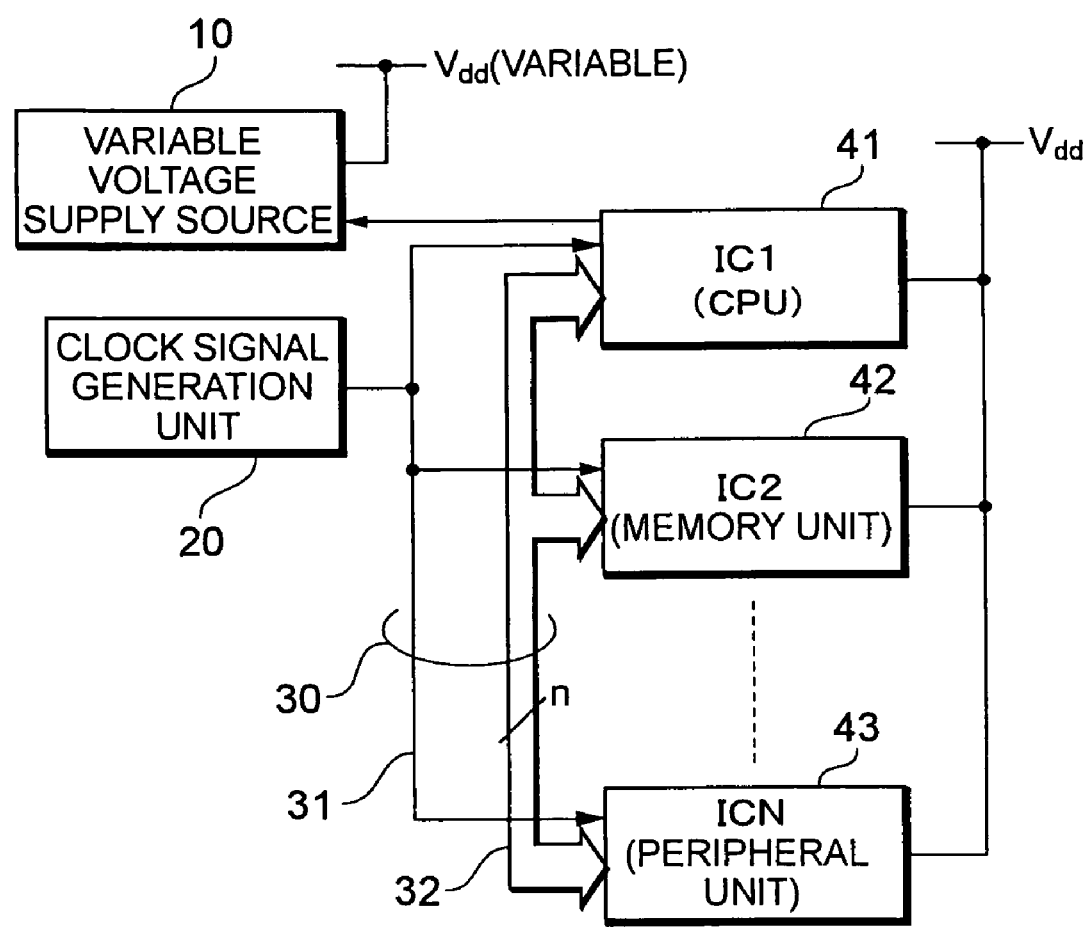
FIG. 1 illustrates an example of an information processor according to the invention, including a multilevel input interface.

FIG. 1 is a schematic block diagram showing a computer system capable of continuously changing a power supply voltage.

In FIG. 1, a variable voltage supply source 10 is a power circuit supplying an operating power supply voltage Vdd to each part of the computer system. The variable voltage supply source 10 includes a DC-DC converter. The DC-DC converter converts an input from a DC power source that uses a battery or commercial power source (not shown in the drawing) into an operating power supply voltage Vdd at a level corresponding to a command signal from a CPU.

A clock signal generation unit 20, which will be described later in detail, generates various clock signals for the computer system based on the system clock, which is a first clock signal. The various clock signals include a data transmission clock signal, which is a second clock signal. The transmission clock signal is supplied to respective function modules 41-43 via a transmission clock line 31 in a signal bus 30. The signal bus 30 includes, in addition to the transmission clock line 31, n data lines 32.

Figure 13:
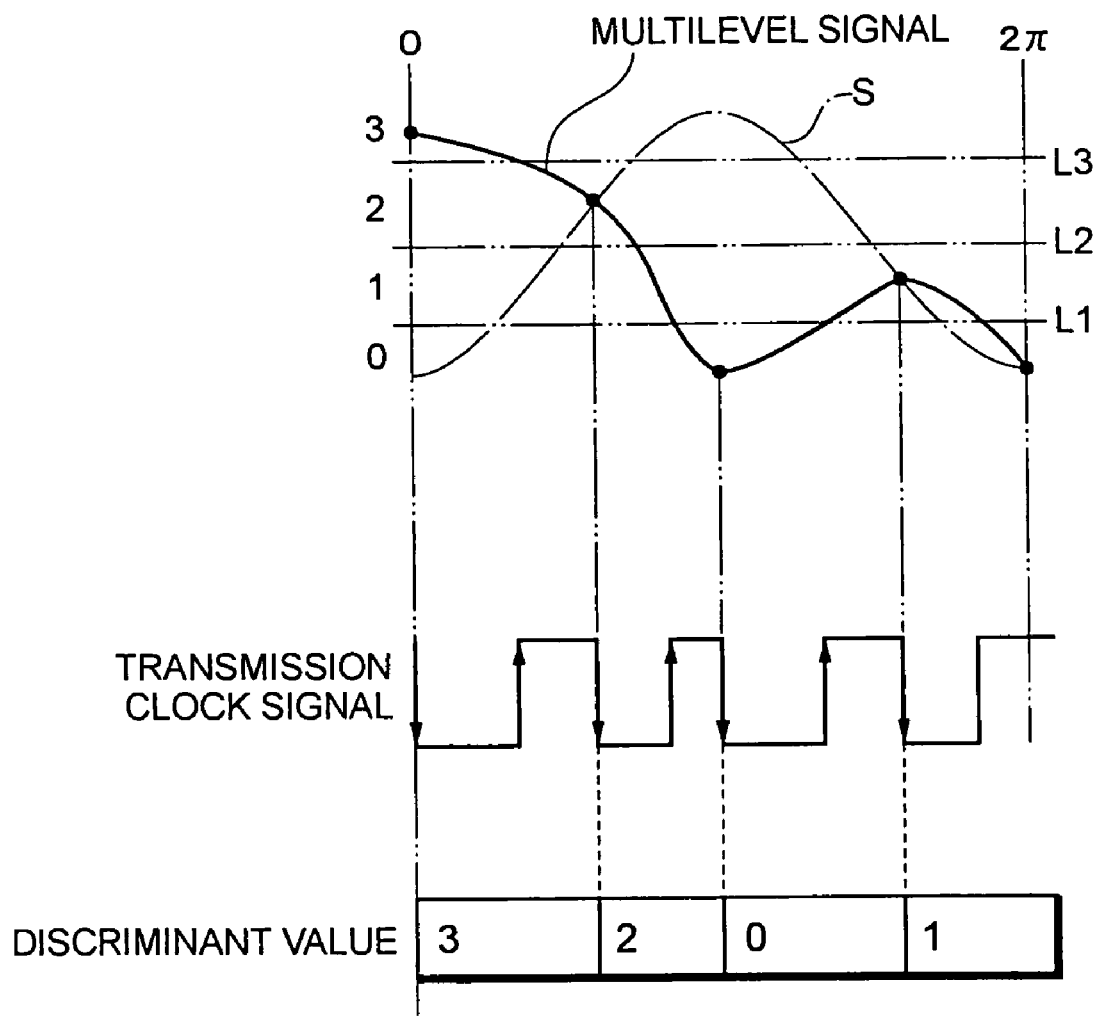
FIG. 13 illustrates an example of the use of a transmission clock signal.
Figure 14:
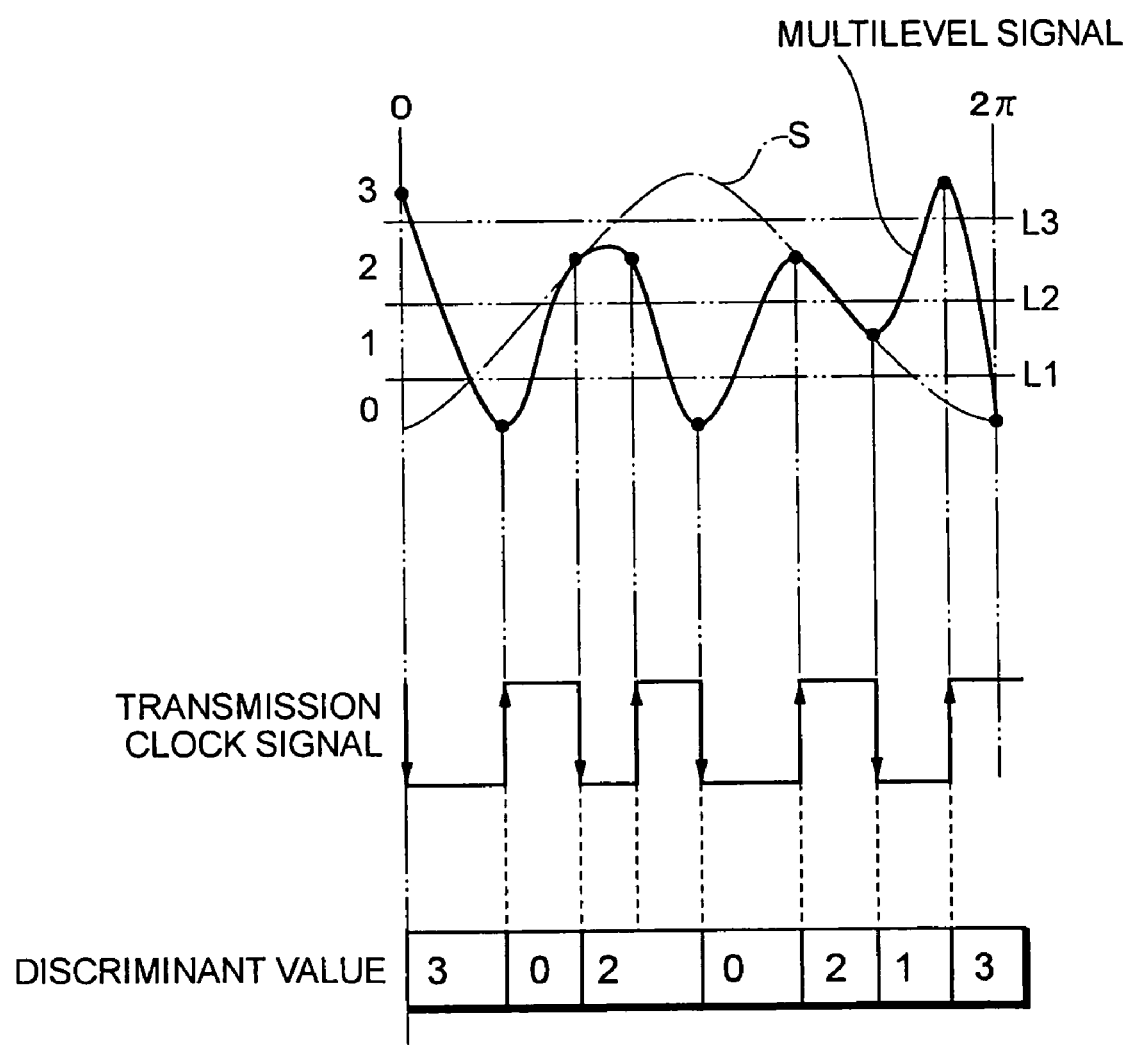
FIG. 14 illustrates another example of the use of a transmission clock signal.

Each module outputs, to its corresponding data line 32, an (analog) multilevel data signal (multilevel input/output signal) whose voltage level continuously changes as shown in FIGS. 13 and 14. For a multilevel input signal, information is defined for each of the voltage levels at the phases (points in the signal on the time axis) of the multilevel input signal corresponding to the rising edges or falling edges, or both edges of a transmission clock. In the example in FIG. 13, four values (0, 1, 2, 3 (M=4)) are defined in one clock section of a system clock signal shown as a dashed line sine wave.

The modules 41-43 are connected to one another by the signal bus 30. The module 41 is an LSI chip serving as a CPU or a board having the LSI chip mounted thereon. The CPU runs an OS and application programs and also controls the voltage in the variable voltage supply source 10. The module 42 is an LSI chip serving as a RAM or a board having the LSI chip mounted thereon. The module 43 is an I/O LSI chip for exchanging data with external devices or a board having the LSI mounted thereon. Note that the modules 41-43 are shown as representative examples of the various types of function modules that can be provided in the computer system. A variable power supply voltage Vdd is supplied from the variable voltage supply source 10 to each module.

Multilevel input interfaces connected to the signal bus 30 will be explained below.

FIG. 3 schematically shows an example 1 of the structure of a function module. The function module includes: a threshold value reference generation unit 410 generating a threshold voltage used for detecting the levels of multilevel input signals; a multilevel input interface 420 converting the multilevel input signals to data signals (binary value); a logic circuit unit 430 based on the binary logic performing predetermined data processing using the converted data signals; and a multilevel output interface 440 converting, by D-A conversion, the result of the data processing (binary value) to multilevel signals in synchronization with a transmission clock and outputting it to the signal bus 30.

Figure 4A:
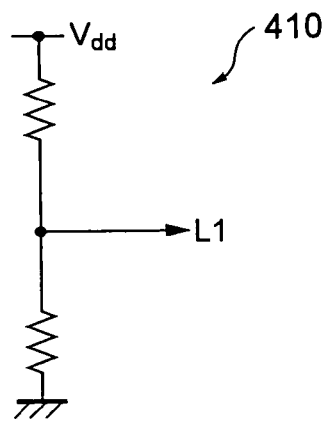
FIG. 4 is a circuit diagram illustrating an example of the structure of a threshold voltage generation unit.
Figure 4B:
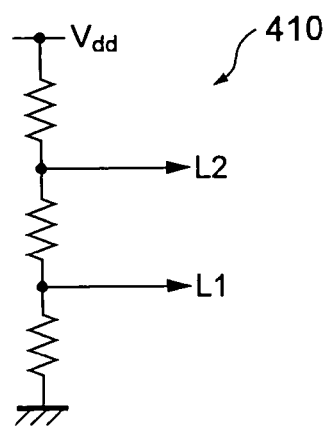
Figure 4C:
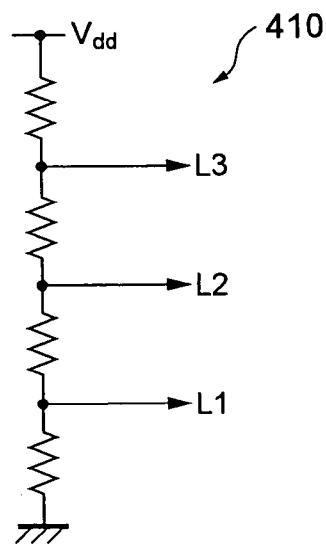

FIG. 4A-4C show examples of the structure of the threshold value reference generation unit 410 that generates, from the (variable) voltage Vdd supplied from the variable voltage supply source 10, comparison reference voltage(s) L1-Ln by means of a resistive voltage dividing circuit using bleeder resistance, and supplies it to the multilevel input interface 420, logic circuit unit 430, and multilevel output interface 440. FIG. 4A shows the case where a multilevel signal is a binary signal, FIG. 4B shows the case where a multilevel signal is a ternary signal, and FIG. 4C shows the case where a multilevel signal is a quaternary signal. The comparison reference voltage L1-Ln is generated according to the level of the variable voltage Vdd.

Figure 5A:
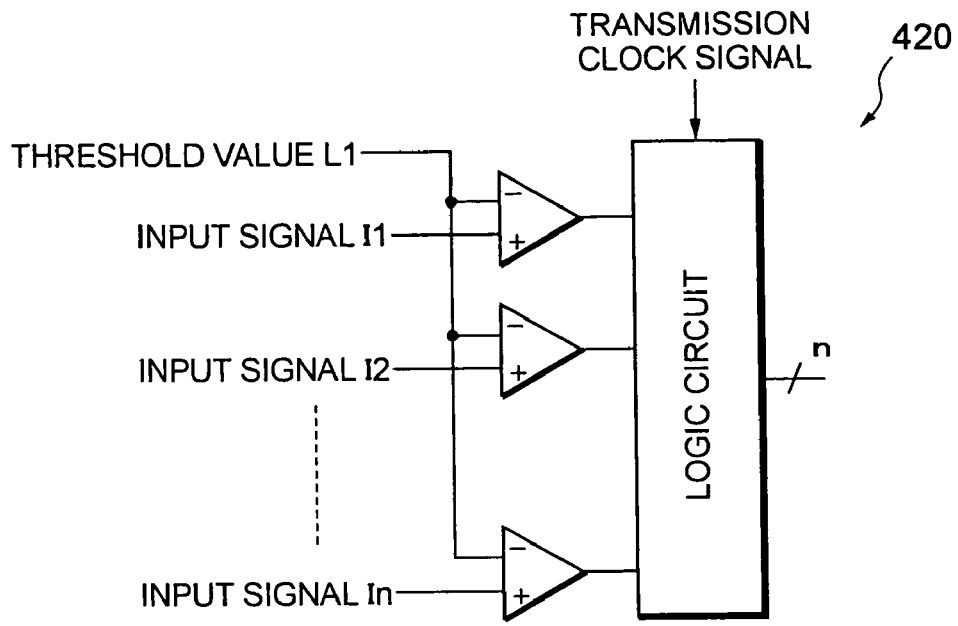
FIG. 5A is a block circuit diagram showing an example of the structure of a multilevel input interface.
Figure 5B:
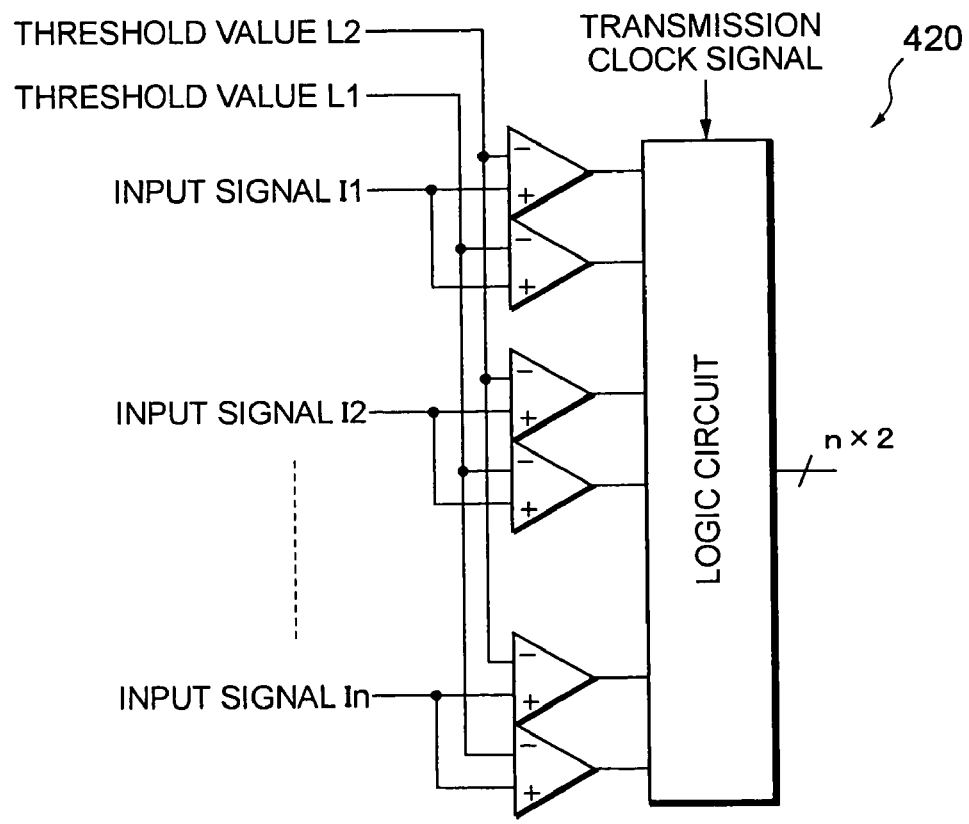
FIG. 5B is a block circuit diagram showing an example of the structure of a multilevel input interface.
Figure 6:
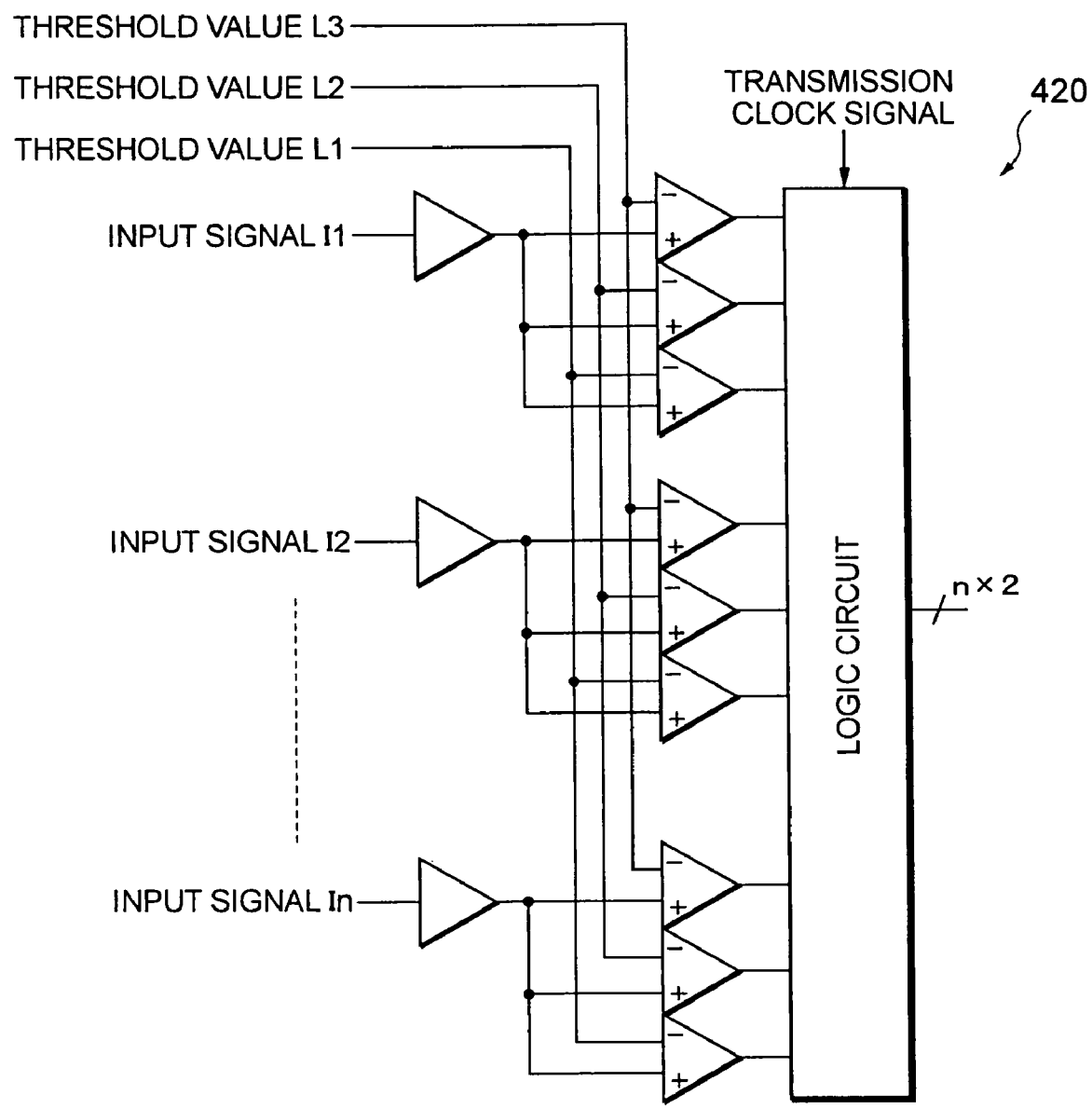
FIG. 6 is a block circuit diagram showing another example of the structure of a multilevel input interface.

FIGS. 5A, 5B and 6 illustrate examples of the structure of the multilevel input interface 420. The multilevel input interface 420 is composed of a plurality of level comparators and a logic circuit that converts input signals to data signals corresponding to the levels of the input signals based on the outputs of the respective level comparators. The logic circuit identifies the timings of reading level information for an input signal by detecting the levels of the input signal in synchronization with a transmission clock signal 31. The logic circuit performs data conversion corresponding to the data type (binary logic, multi-value logic) handled in the subsequent logic circuit unit 430.

In the example of FIG. 5A, n binary (0,1) input signals are converted to n binary data signals (number of signal lines=n). In the example shown in FIG. 5B, n ternary (0, 1, 2) input signals are converted to 2×n binary data signals (number of signal lines=2×n). In the example of FIG. 6, n quaternary (0, 1, 2, 3) input signals are converted to 2×n binary data signals (number of signal lines=2×n).

Note that, as described above, in accordance with the subsequent multi-value logic processing, one multilevel input signal may be output as data signals of 4-bit, 8-bit, 16-bit, 32-bit, 64-bit, or 128-bit or the like, according to the value of the multilevel input signal. For example, the information for a multilevel input signal in one clock cycle of the system clock may be handled as an 8-bit data signal and sent to the subsequent logic circuit 430 as serial data (number of signal lines=1) or parallel data (number of signal lines=8).

Note that a data signal includes various information such as address information, commands (instructions), and data (values).

Moreover, the level comparators identifying a signal level based on threshold values may be replaced with window comparators capable of determining whether or not an input signal is within the range between predetermined values. The level comparators may alternatively be replaced with A-D converters.

As described above, the subsequent logic circuit unit 430 based on the binary logic executes predetermined data processing depending on the purpose of the module it belongs to. The result of the processing is sent to the multilevel output interface 440. The multilevel output interface 440 D-A converts the result of the processing (binary value) to multilevel output signals (multilevel signal) O1-On in synchronization with the transmission clock, and outputs it to the signal bus 30. For example, when the logical circuit unit 430 belongs to a memory (storage unit) module, it stores, when receiving a write command, write data in a location designated by a write destination address. Also, when receiving a read command, it outputs data it reads from a location designated by a read source address to the signal bus 30.

Figure 7:
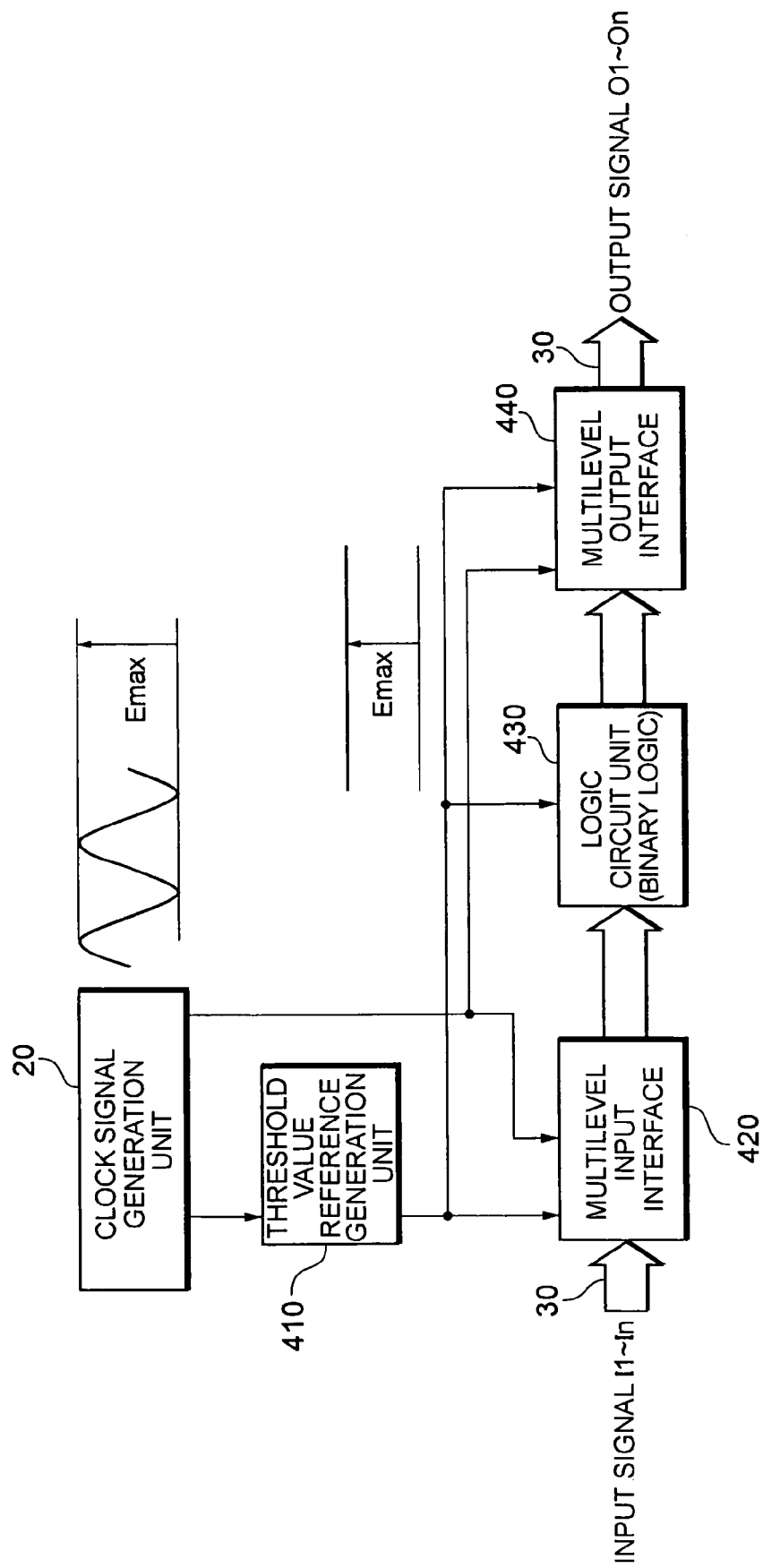
FIG. 7 illustrates an example of another function module (using a clock signal voltage).

FIG. 7 illustrates another embodiment. In FIG. 7, the components corresponding to those in FIG. 3 are given the same reference numerals and their explanations will be omitted.

In this embodiment, the amplitude voltage Emax of a sine-wave system clock signal, which is outputted by the clock signal generation unit 20, is used. The threshold value reference generation unit 410 includes a circuit for converting the amplitude voltage Emax of a system clock signal to a direct current voltage Emax, and uses this direct current voltage Emax as a bias power source of the above-described resistive voltage dividing circuit.

Figure 8:
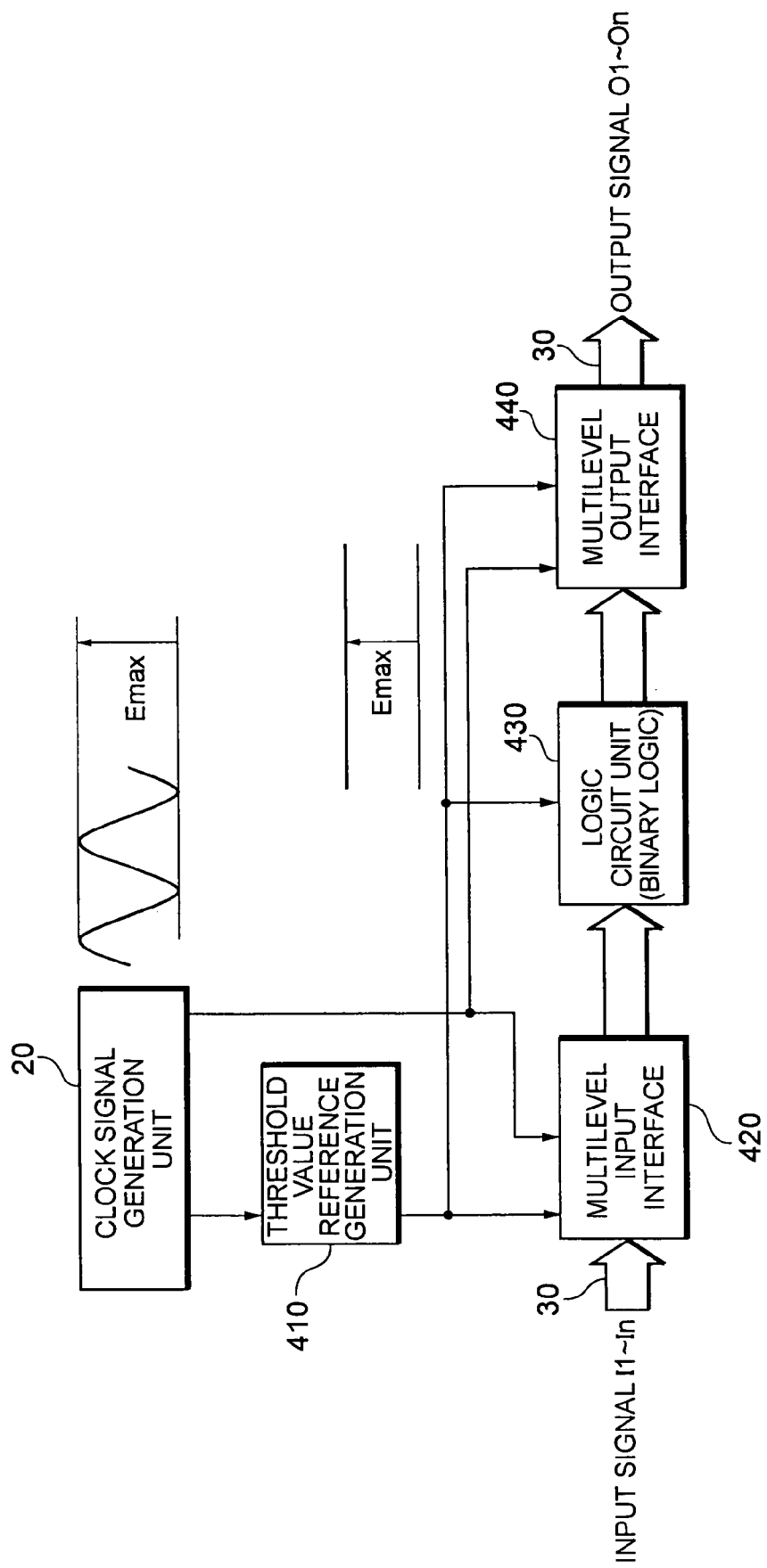
FIG. 8 illustrates an example of still another function module (multi-value logic).

FIG. 8 illustrates still another embodiment. In FIG. 8, the components corresponding to those in FIG. 7 are given the same reference numerals and their explanations will be omitted.

In this embodiment, the logic circuit unit 430 is structured based on multi-value logic. The logic circuit in the multilevel input interface 420 converts multilevel input signals to data signals for the multi-value logic. Moreover, the multi-value logic output interface 440 converts, in synchronization with a transmission clock, the multilevel output the logic circuit unit 430 outputs, to an output signal of a corresponding multilevel using a D-A converter.

As described above, even when the supply voltage for the respective modules is (continuously) changed and so the multilevel signal level in the signal bus changes, level detection (data modulation based on the signal level) is performed by obtaining a threshold voltage corresponding to the change in the supply voltage. Accordingly, in the computer system employing the control method where the power supply voltage is continuously changed (see FIG. 2), the multilevel input interface can achieve stable signal level detection.

Figure 9A:
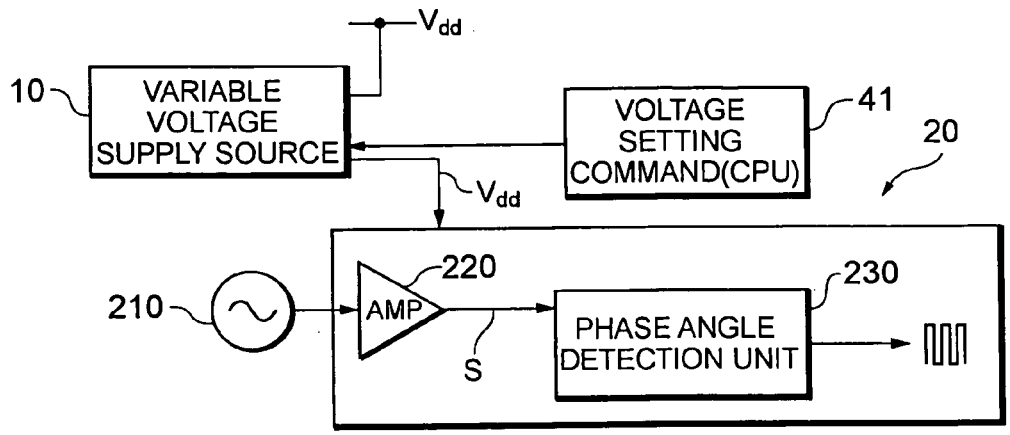
FIG. 9A illustrates an example of the structure of a clock signal generation unit.

FIG. 9A illustrates the clock signal generation unit 20 outputting a transmission clock signal.

As shown in FIG. 9A, the clock signal generation unit 20 includes: a sine wave oscillator 210 generating a sine-wave system clock signal (first clock signal) S; an amplifier 220 amplifying the level of the system clock signal S; and a phase angle detection unit 230 generating a transmission clock signal (second clock signal) from the system clock signal S. The phase angle detection unit 230 includes a plurality of (in this example, four) window comparators and a logic circuit (see FIG. 5). The variable voltage supply source 10 supplies, to the amplifier 220 and phase angle detection unit 230, the power supply voltage Vdd, which is determined in accordance with a voltage set command signal from the CPU 41. The amplitude Max of the system clock signal S is determined in accordance with the power supply voltage Vdd.

Figure 9B:
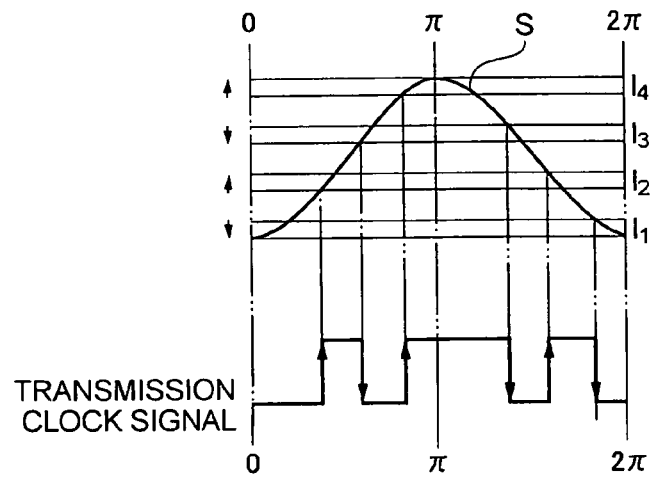
FIG. 9B illustrates the operation of a phase angle detection unit.
Figure 9C:
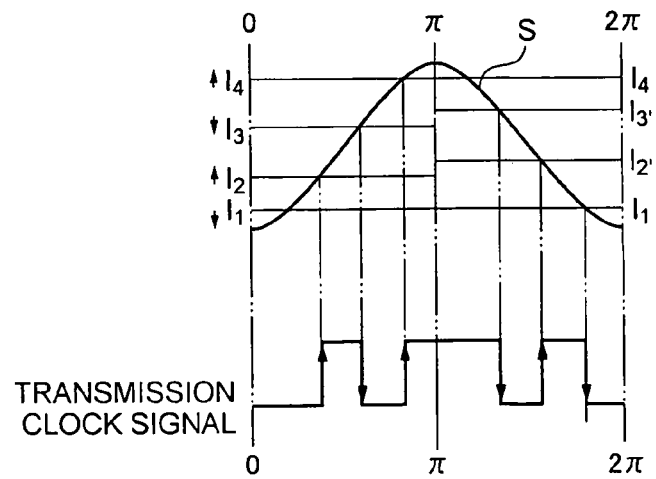
FIG. 9C illustrates the operation of the phase angle detection unit.

FIG. 9B and FIG. 9C illustrate the operation of the phase angle detection unit 230. The phase angle detection units 230 divides the amplitude range of the system clock signal S into n zones, each zone defined by threshold values; detects the phase angles of the system clock signal S (points in the system clock signal S on the time axis) at the threshold values by means of window comparators; and generates a transmission clock signal by determining rising and falling edges of the waveform of the transmission clock signal corresponding to the detected phases. Thus, the width of the pulse signal waveform of the transmission clock signal varies, the frequency spectrum component of the transmission clock signal is spread as much as possible, and thereby the odd-number n-order high-frequency component can be reduced.

In the example of FIG. 9B, four threshold values I1, I2, I3, and I4 arbitrarily set by n-division define detection ranges for the respective window comparators.

In the example of FIG. 9C, four threshold values (four threshold values I1, I2, I3, and I4 in the range between 0 and π (0 and 180 degrees) and four threshold values I1, I2', I3' and I4 in the range between π and 2π (180 and 360 degrees)) are set by n-division. The threshold values in the range between 0 and π and the corresponding threshold values in the range between π and 2π are slightly shifted from each other. The degree of this shift may be determined according to the detection ranges of the window comparators. This makes the waveform of the transmission clock signal bilaterally asymmetrical and so prevents the increase in the level of a specified frequency component (spectrum). Shown on the left side of the lines indicating the threshold values (in the proximity of the line indicating the phase angle 0 degree are arrows representing the rising and falling of the waveform of the transmission clock signal at the threshold values. The bottom section of FIG. 9C shows an example where a transmission clock is generated from one cycle of the system clock signal (sine wave) S.

Figure 10:
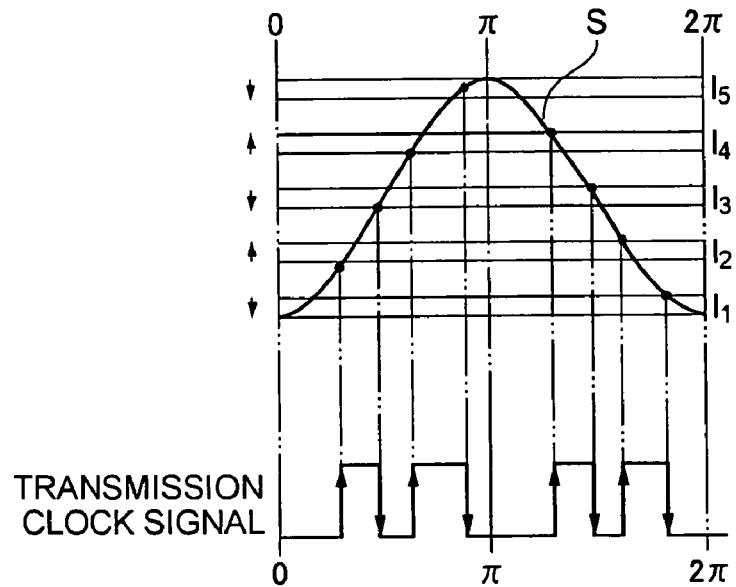
FIG. 10 illustrates an example of the generation of another transmission clock.

FIG. 10 shows an example where, in the phase angle detection unit 230, five threshold values (five threshold values I1, I2, I3, I4 and I5 in the first half of a cycle—0-π—and five threshold values I1', I2', I3', I4', and I5' in the latter half—π-2π—) are set by n-division. In this example, the threshold values in the range 0-π and the corresponding threshold values in the range π-2π are slightly shifted from each other, using the upper and lower limits of the window comparators. This makes the waveform of the transmission clock signal bilaterally asymmetrical and so prevents the increase in the level of a specified frequency component (spectrum).

Figure 11:
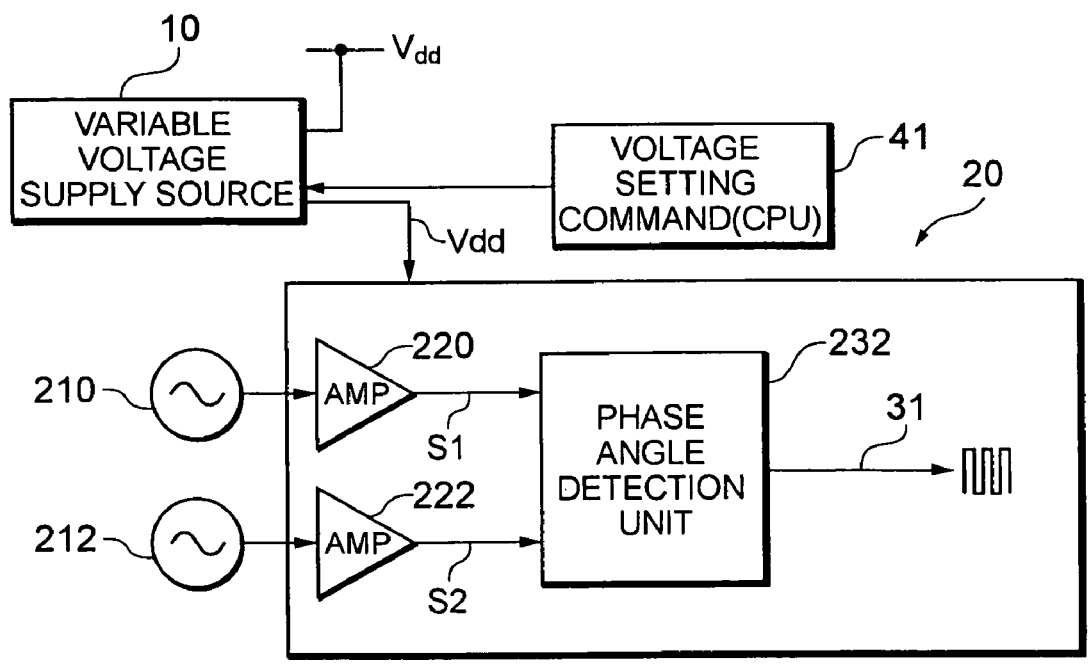
FIG. 11 illustrates an example of the structure of another clock signal generation unit.

FIG. 11 illustrates another example of the structure of the clock signal generation unit 20. In FIG. 11, the components corresponding to those in FIG. 9A are given the same reference numerals.

As shown in FIG. 11, the clock signal generation unit 20 includes: sine wave oscillators 210 and 212 generating sine wave system clock signals S1 and S2; amplifiers 220 and 222 amplifying the levels of the two system clock signals S1 and S2; and a phase angle detection unit 232 generating a transmission clock signal from the level-controlled system clock signals S1 and S2. The variable voltage supply source 10 supplies the power supply voltage Vdd, which is set in accordance with a voltage set command signal from the CPU 41 to the amplifiers 220, 222 and phase angle detection unit 232. The amplitude Emax of the system clock signal S1 is determined according to the power supply voltage Vdd.

Figures 12A, 12B, 12C, 12D, 12E:
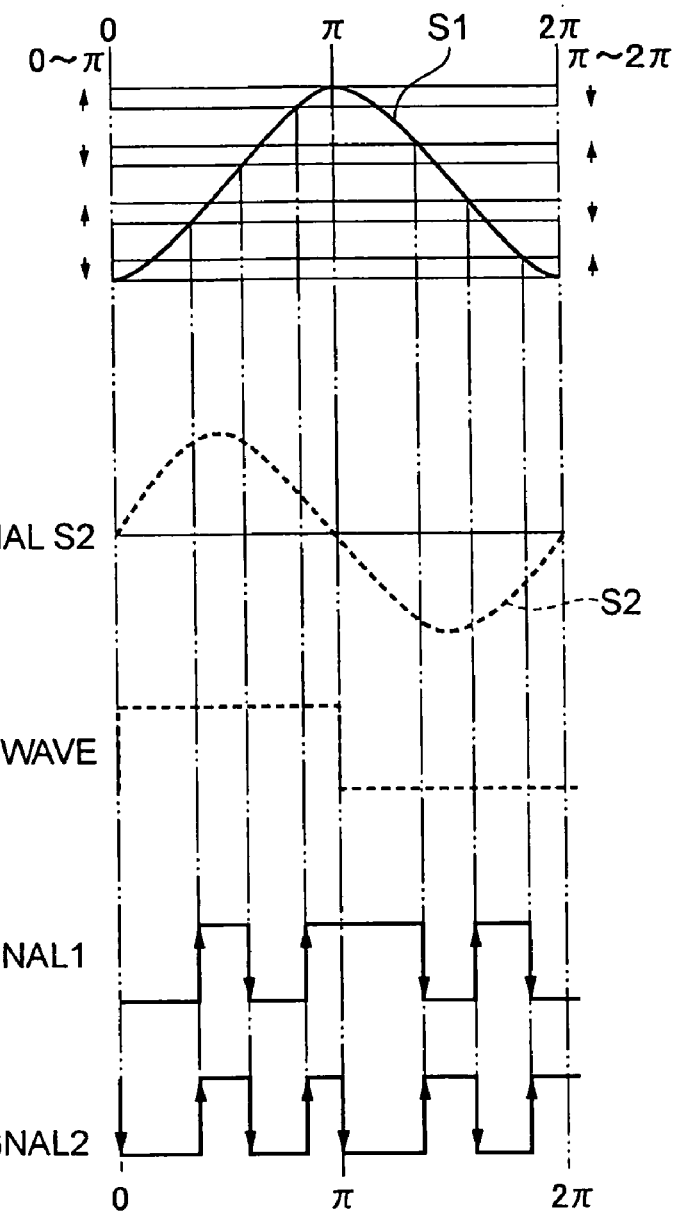
FIG. 12 illustrates an example of the generation of a transmission clock.

As (A) and (B) in FIG. 12 show, there is a π/2 (90 degrees) phase difference between the system clock signal S1 and system clock signal S2. The phase angle detection unit 232 generates a transmission clock signal 1 ((D) in FIG. 12) from the system clock signal S1, in the same manner as in the FIG. 9B example. It also obtains, from the system clock signal S2, a rectangular wave ((C) in FIG. 12) being high "H" in the range 0-π and low "L" in the range between π and 2π, combines the rectangular wave and the transmission clock signal 1 to generate a transmission clock signal 2 ((E) in FIG. 12) based on a predetermined logic (e.g., using the transmission clock signal 1 in the range between 0 and π and inverting the transmission clock signal 1 in the range between π and 2π).

As (A) and (E) in FIG. 12 show, in the range between 0 and π of the system clock signal S1, the rising and falling of the waveform of the transmission clock signal 2 at the threshold values is determined in accordance with the direction of the arrows shown in the proximity of the line indicating the phase angle 0 degree of the system clock signal S1. Also, in the range between π and 2π of the system clock signal S1, the rising and falling of the waveform of the transmission clock signal 2 at the threshold values is determined in accordance with the direction of the arrows shown in the proximity of the line indicating the phase angle 2π (360 degrees) of the system clock signal S1.

Note that in the above-described embodiments, the phase angle detection units 230, 232 determine the rising and falling edges of transmission clock signals based on the threshold values set when dividing the amplitude value by n. However, they may determine the rising and falling edges by locating the points in the system clock signal on the time axis, i.e., by checking the phases of the system clock signal. For example, they may generate the waveforms of the transmission clock signals by comparing the count value of the counter that is reset in each cycle of the system clock signal with the data for predetermined rising and falling edges of the waveform of the transmission clock signals.

A transmission clock signal generated as above is sent to the signal bus 30 and further to the multilevel input interface in each module. As shown in FIGS. 13 and 14, the multilevel input interface detects the levels of multilevel signals in synchronization with the transmission clock signal and thereby, ascertains the values defined for those levels. Then, the multilevel output interface converts (D-A converts) an internal data signal to a multilevel signal (level signal) in synchronization with the transmission clock signal and outputs it to the signal bus 30.

As explained above, in the embodiments of the invention, threshold values in the information processor device can be changed based on supply voltages/system clock signals, so the CPU or the like does not have to set or control the threshold values, accordingly, the loads on the CPU controlling the computer system can be reduced. Moreover, because this is achieved by hardware structures, the performance of the device improves. Furthermore, because a plurality of threshold values are determined, logic devices based on multi-value logics can be easily realized.

Also, according to the embodiments of the invention, because the clock of a single frequency component (e.g., sine wave, triangular wave) is used as a system clock signal, it is possible to minimize signal distortion during transmission due to the N-order harmonics and phase distortion due to the differences in the delay characteristics of the frequency components when sending data signals to a plurality of devices. Because the N-order harmonics are reduced, radiation noise from the information processor or devices can be reduced, consequently contributing to power savings. Furthermore, it is convenient that clocks having different frequencies can be easily generated by combining single frequency clocks having different phases.

The clock signal generator (clock signal circuit) or information processor according to the invention may be employed in information devices such as televisions as well as portable devices such as portable phones, portable personal computers and PDAs. The above-described various effects (power saving, enhancement of performance, control load reduction in CPUs, reduction of phase distortion) of the invention are significant when the invention is applied in portable devices. Likewise, the clock signal generator or information processor according to the invention may also be employed in moving objects such as vehicles and the same effects as those obtained when applied in portable devices can be achieved.

Figure 16A:
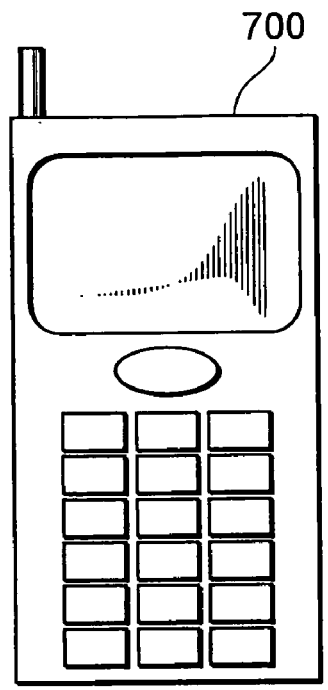
FIG. 16 illustrates an example of an application of the invention.
Figure 16B:
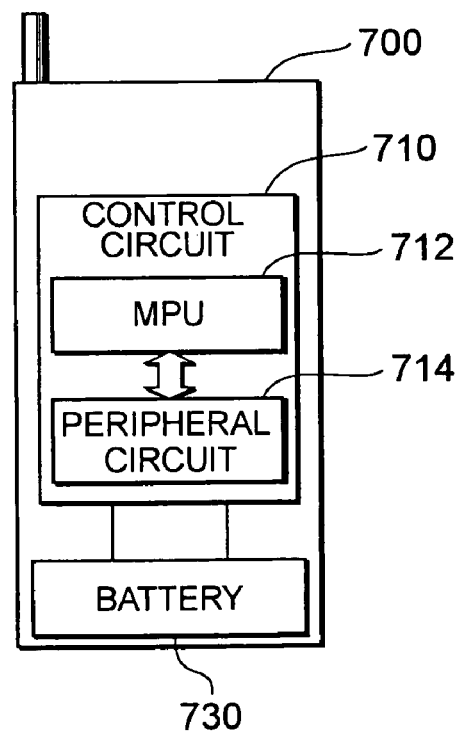

FIGS. 16A and 16B illustrate a portable phone using the circuits according to any of the embodiments of the invention. FIG. 16A shows the external view of a portable phone 700 and FIG. 16B shows an example of its internal structure. The portable phone 700 includes a control circuit 710 controlling the operation of the portable phone 700 and a battery 730. The battery 730 supplies power to the control circuit 710. Note that the battery 730 may be a fuel cell. The control circuit 710 includes an MPU 712 and a peripheral circuit 714. The MPU 712 is the equivalent of the CPU 41 in FIG. 1 and the peripheral circuit 714 includes the circuit 20 in FIG. 9. The control circuit 710 can execute various processing explained in the above embodiments.

What is claimed is:

1. A clock signal generator comprising:
   a signal generation unit that outputs a first clock signal composed of a single frequency component; and
   a phase angle detection unit that detects phase angles of the first clock signal by comparing a plurality of threshold values set within the amplitude of the first clock signal with instantaneous values of the first clock signal, and generates a second clock signal by determining rising and/or falling edges of the signal according to the detected phase angles,
   the rising and/or falling edges being determined by using a first group of threshold values in a first half of the cycle of the first clock signal and using a second group of threshold values in a latter half of the cycle of the first clock signal, the first group of threshold values and the second group of threshold values being shifted from each other.

2. The clock signal according to claim 1, wherein the second clock signal is used as a transmission clock signal for a signal bus, and a maximum amplitude value of the waveform of the first clock signal is determined according to a maximum value of a multilevel signal passing through a data line in the signal bus.

3. The clock signal generator according to claim 1, wherein the first clock signal is a sine wave.

4. The clock signal generator according to claim 1, wherein the comparison between the threshold values and the instantaneous values is performed by a plurality of window comparators.

5. The clock signal generator according to claim 4, wherein a degree of the shift of the first group of threshold values relative to the second group of threshold values is determined based on detection ranges of the plurality of window comparators.

6. The clock signal generator according to claim 4, wherein a degree of the shift of the first group of threshold values relative to the second group of threshold values is determined based on upper and lower limits of the plurality of window comparators.

* * * * *